INVENTOR.
Ernest E. Murray.

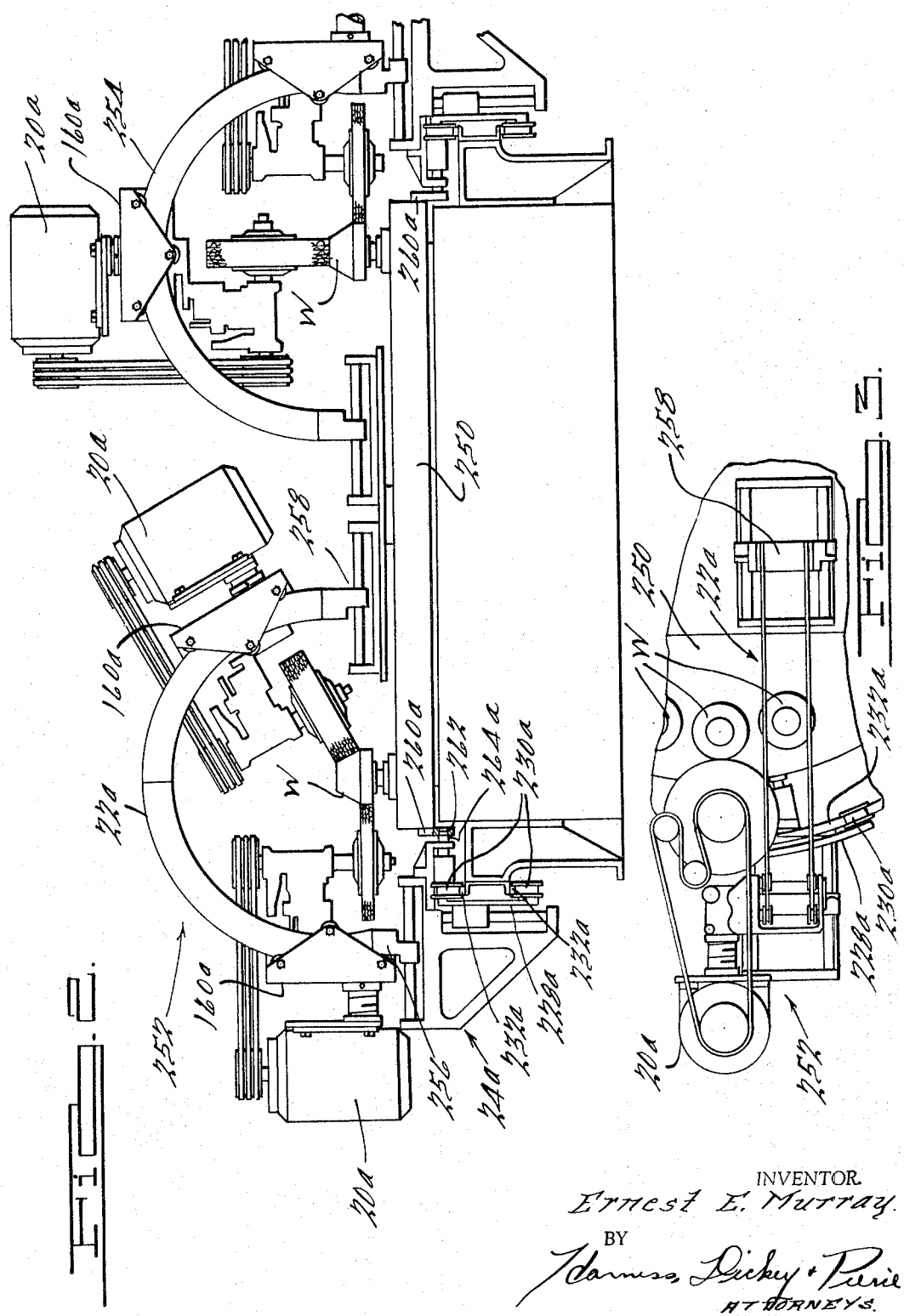

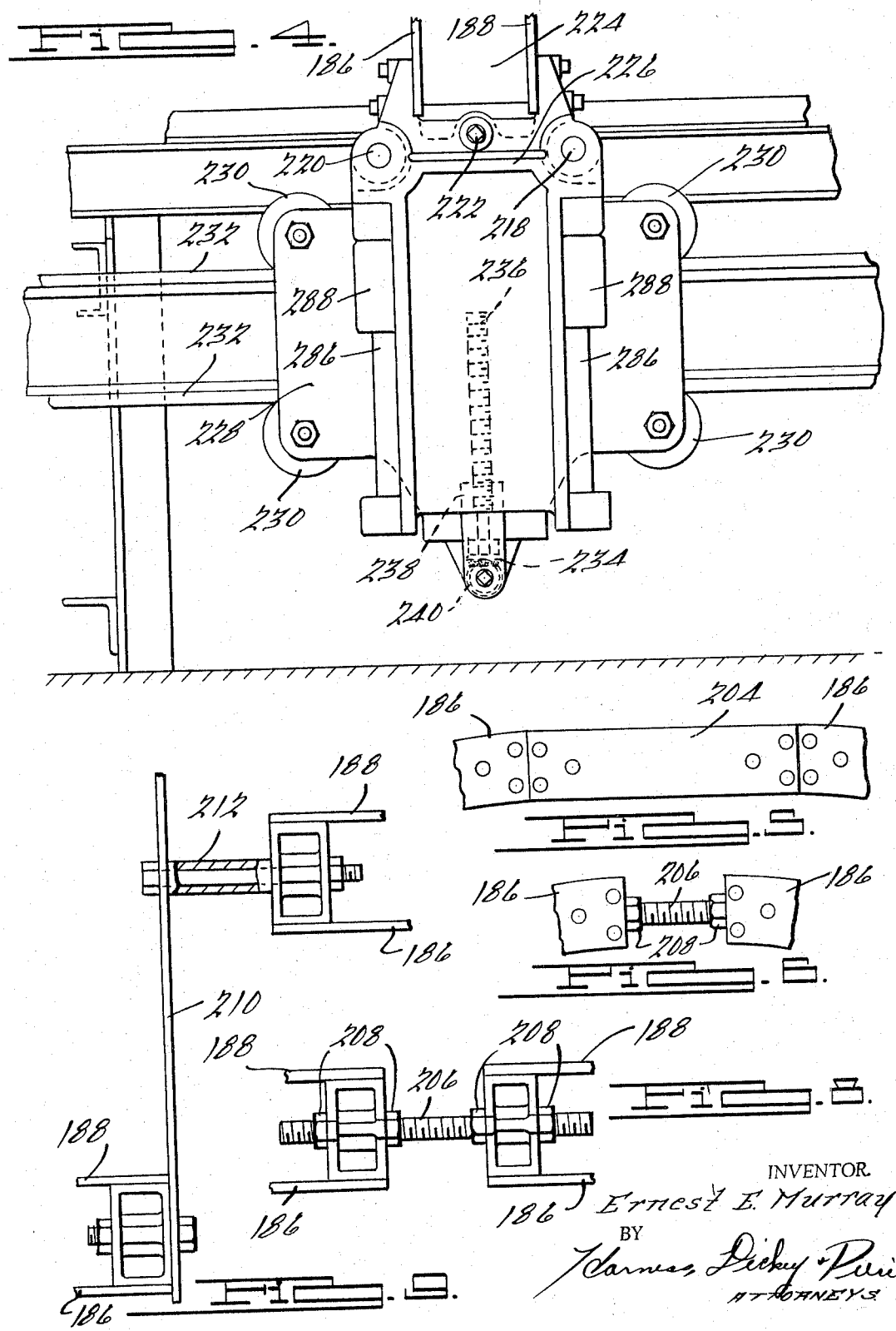

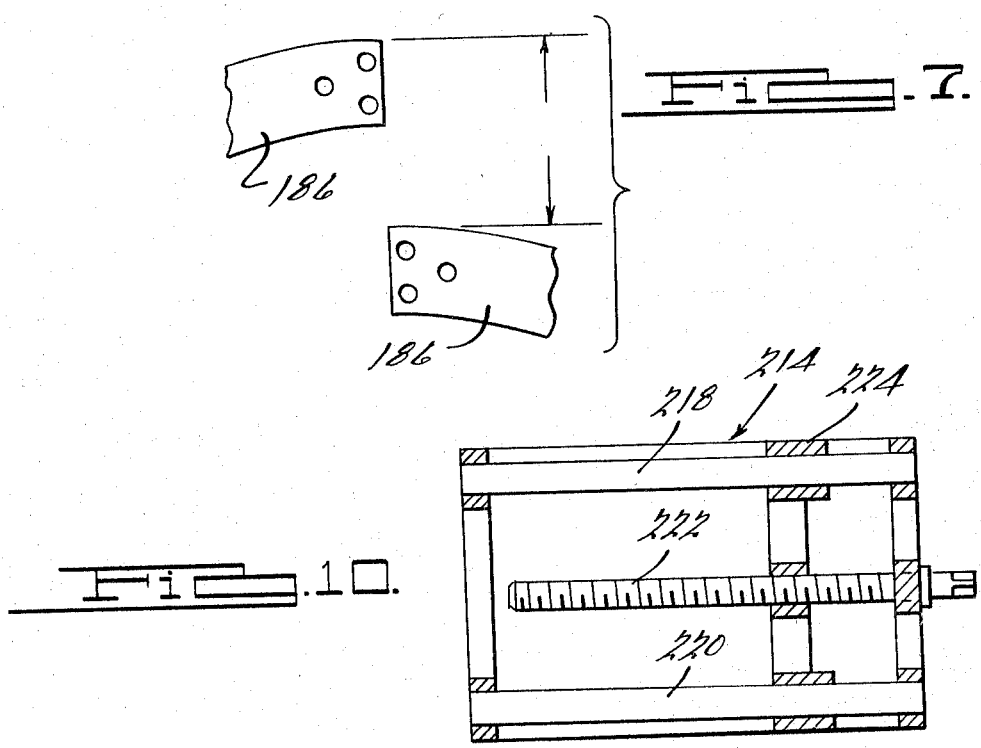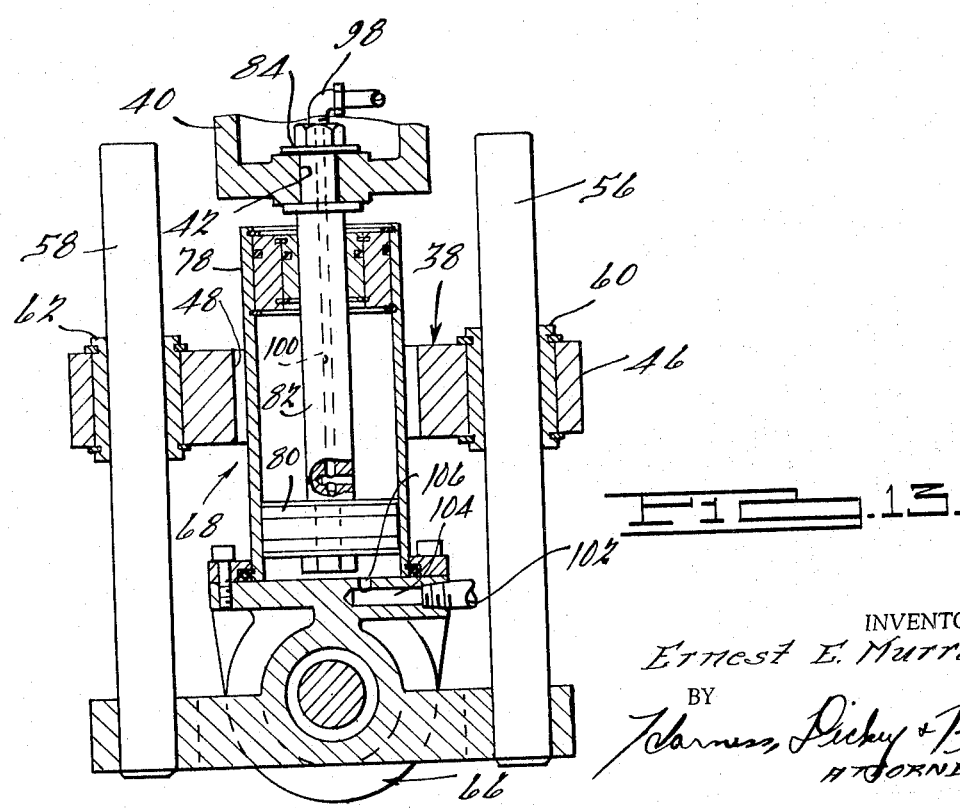

Jan. 3, 1967 E. E. MURRAY 3,295,261
WORK WHEEL MECHANISM AND ASSOCIATED APPARATUS
Filed June 3, 1964 8 Sheets-Sheet 5
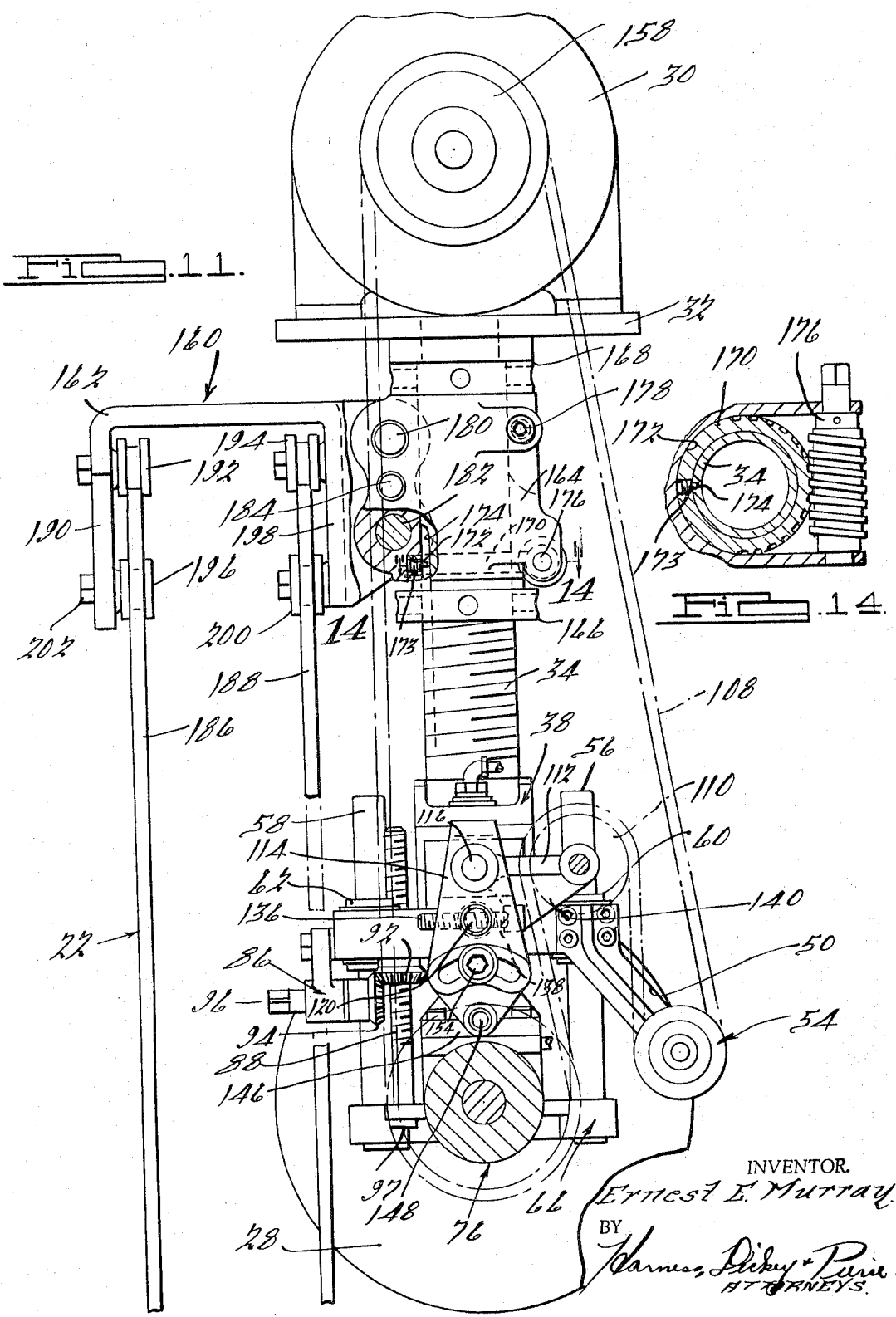
INVENTOR.
Ernest E. Murray
BY
Harness, Dickey & Pierce
ATTORNEYS Jan. 3, 1967        E. E. MURRAY        3,295,261
WORK WHEEL MECHANISM AND ASSOCIATED APPARATUS
Filed June 3, 1964                      8 Sheets-Sheet 6

INVENTOR.
Ernest E. Murray
BY
Harness, Dickey & Pierce
ATTORNEYS.

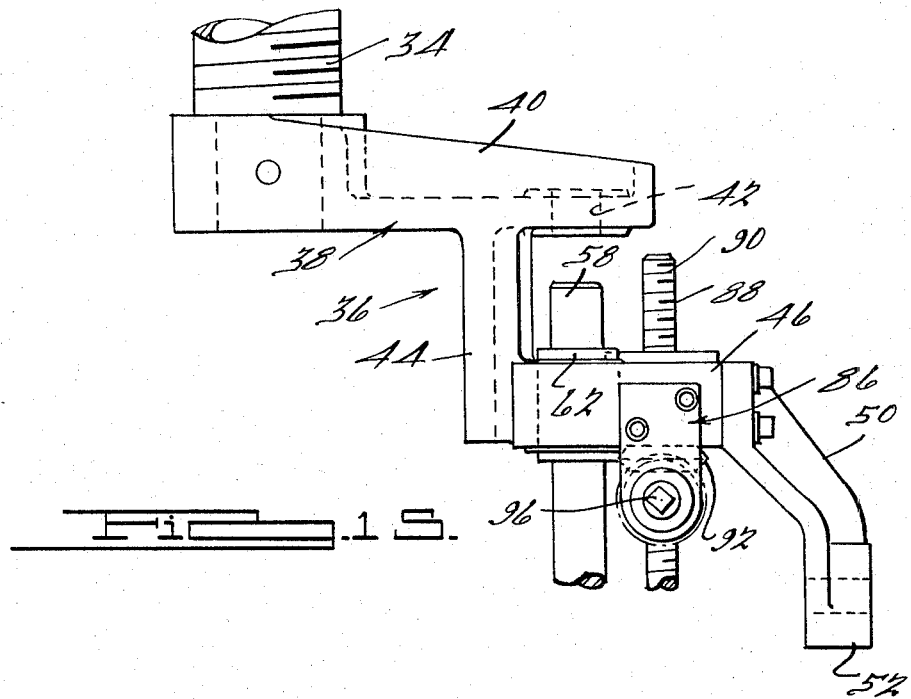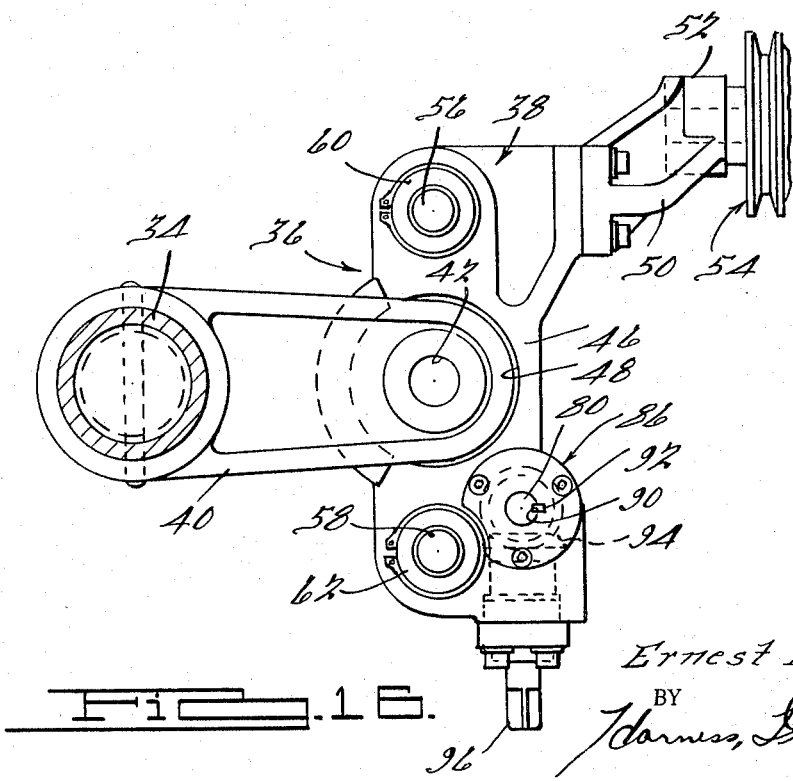

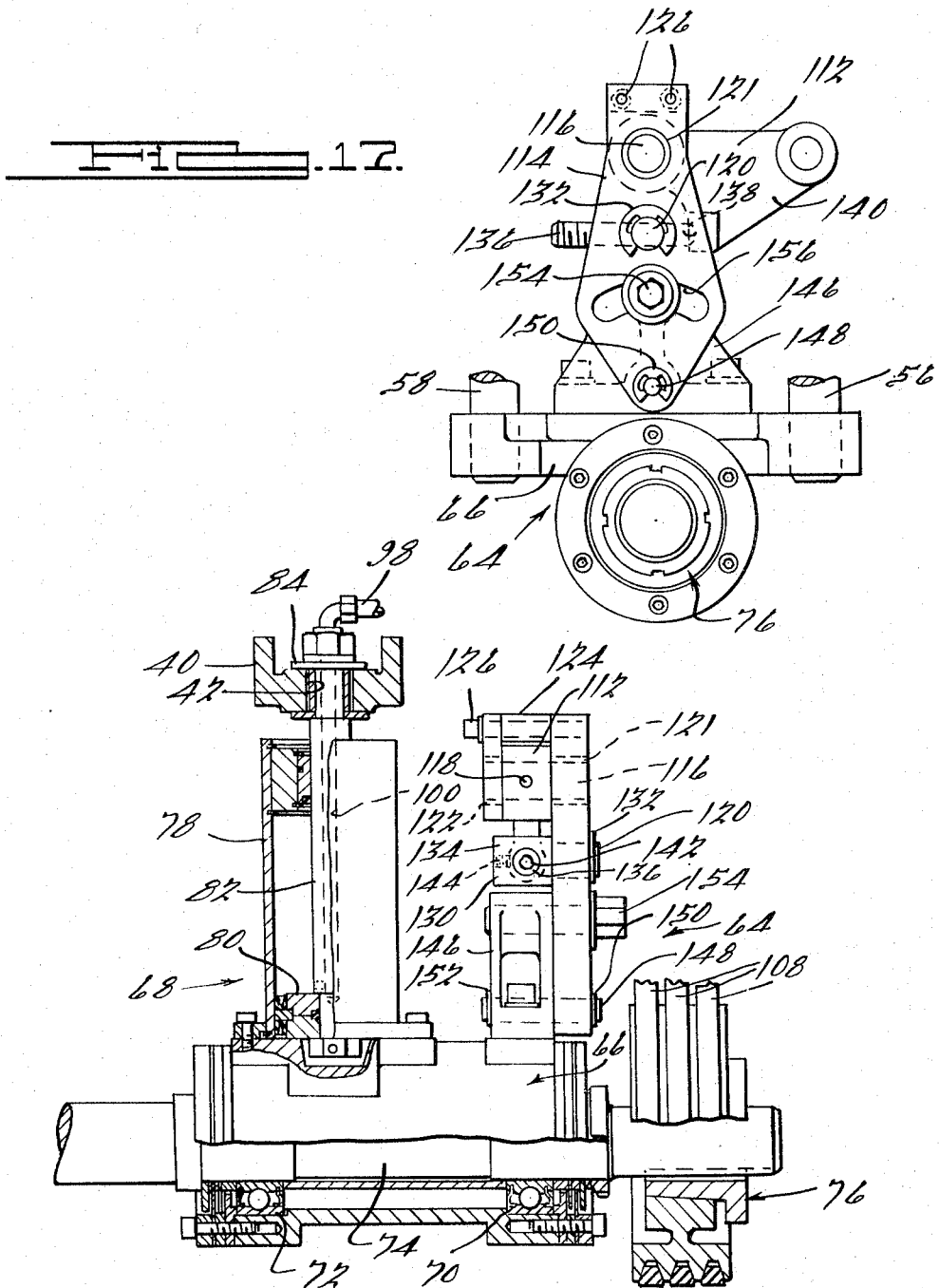

United States Patent Office 3,295,261
Patented Jan. 3, 1967

3,295,261
WORK WHEEL MECHANISM AND
ASSOCIATED APPARATUS
Ernest E. Murray, 6765 Meadowlake,
Birmingham, Mich. 48010
Filed June 3, 1964, Ser. No. 372,228
32 Claims. (Cl. 51—108)

This invention relates to work wheel mechanisms and more specifically to a novel buffing wheel mechanism and novel apparatus for manipulating such work wheel mechanisms.

It is a general object of this invention to provide a novel work wheel mechanism.

It is another object of this invention to provide a novel apparatus for manipulating such a work wheel mechanism.

It is another object of this invention to provide a novel buffing wheel mechanism.

Other objects, features, and advantages of the present invention will become apparent from the subsequent description and the appended claims, taken in conjunction with the accompanying drawings, in which:

FIGURE 2 is a front elevational view of a different novel assembly including a plurality of work wheel mechanisms;

FIGURE 3 is a fragmentary plan view of a part of the assembly of FIGURE 2;

FIGURE 4 is a view of the assembly of FIGURE 1 taken substantially in the direction of the line 4—4;

FIGURES 5, 6 and 7 are front elevational views of modifications of the assembly of FIGURE 1 specifically within the area indicated by the circle 5;

FIGURE 8 is a top elevational view of the modification of FIGURE 6;

FIGURE 9 is a top elevational view of a different modification of the assembly of FIGURE 1 specifically within the area indicated by the circle 5;

FIGURE 10 is a sectional view of the apparatus of FIGURE 1 taken substantially along the line 10—10;

FIGURE 11 is a front elevational view of one of the work wheel mechanisms of the assembly of FIGURE 1 with some parts shown broken away and others shown in section;

FIGURE 13 is a sectional view of the work wheel mechanism of FIGURES 11 and 12 taken substantially along the line 13—13 in FIGURE 12;

FIGURE 14 is a sectional view of the work wheel mechanism of FIGURES 11 and 12 taken substantially along the line 14—14 in FIGURE 11;

FIGURE 15 is a side elevational view to enlarged scale of a spindle bracket assembly of the work wheel mechanism of FIGURES 11 and 12;

FIGURE 16 is a plan view to enlarged scale of the spindle bracket assembly of FIGURE 15;

FIGURE 17 is a front elevational view to enlarged scale of a spindle, work pressure cylinder and belt tightener assembly of the work wheel mechanism of FIGURES 11 and 12; and FIGURE 18 is a side elevational view to enlarged scale of a spindle, work pressure cylinder and belt tightener assembly of the work wheel mechanism of FIGURES 11 and 12 with some parts shown partially broken away.

Figure 1:
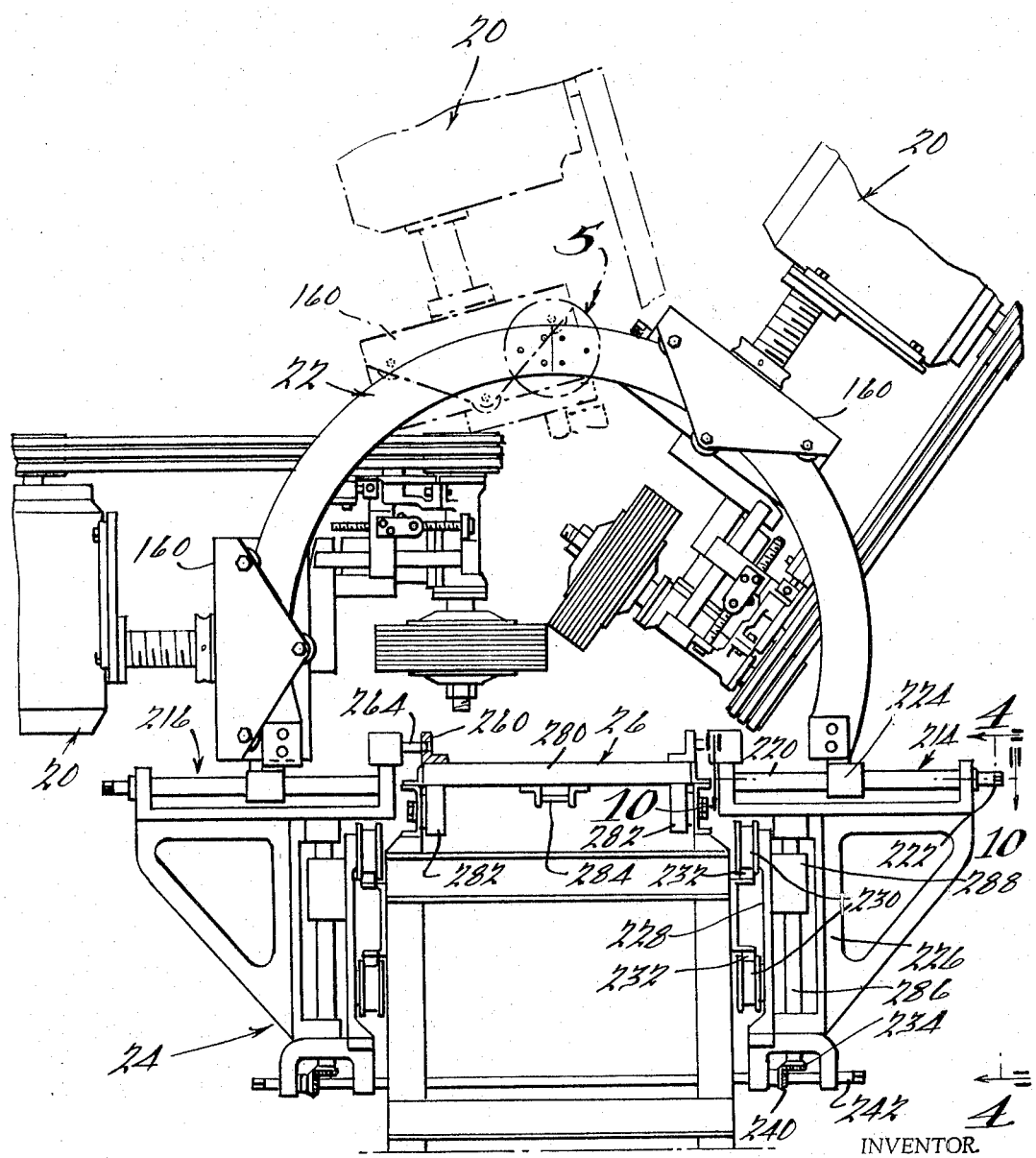
FIGURE 1 is a front elevational view of a novel assembly including a plurality of work wheel mechanisms of the present invention.

Looking now to FIGURE 1, a plurality of work wheel mechanisms 20 are shown to be mounted upon a support structure 22 which in turn is connected to a carrying structure 24 whereby the work wheel mechanism 20 can be located and moved relative to a work support table 26.

The details of the work wheel mechanism 20 can best be seen in FIGURES 11-18 and includes a buffing wheel 28 which is adapted to be rotated by means of an electric motor 30. A platform structure 32 holds the motor 30 and is fixed to one end of an externally threaded support tube 34. A spindle bracket assembly 36 is fixed to the opposite end of the tube 34 and includes a support bracket 38 having a ribbed portion 40 which extends transversely, rearwardly therefrom and terminates in a bore 42 which extends parallelly to the tube 34 and serves a purpose to be described. A depending portion 44 extends generally downwardly from the bottom of the ribbed portion 40 and terminates in a generally flat lower portion 46 which extends transversely, rearwardly underneath the bore 42 and has an enlarged bore 48 generally in coaxial alignment therewith. A pulley support bracket 50 is secured to one end of the lower portion 46 and extends downwardly and terminates in a boss portion 52 which is adapted to support a pulley assembly 54 for rotation about an axis transverse to the axis of the support tube 34. A pair of support rods 56, 58 slidably extend through bushings 60, 62 respectively, fixed in the lower portion 46 and laterally spaced on opposite sides of the enlarged bore 48.

The support rods 56, 58 are a part of a spindle, work pressure cylinder and belt tightening assembly 64 (FIGURES 17, 18). The support rods 56, 58 have their lower extremities fixed intermediate the ends of the housing of a bearing assembly 66. The bearing assembly 66 supports on its upper surface near its forward end a pressure cylinder assembly 68 which serves a purpose to be described. The bearing assembly 66 includes a pair of spaced bearings 70, 72 which rotatably support a spindle 74 for rotation about an axis parallel to the axis of rotation of the pulley assembly 54. The spindle 74 extends outwardly rearwardly and supports on its rearward end a drive pulley assembly 76 and extends outwardly forwardly and supports on its forward end the buffing wheel 28.

The pressure cylinder assembly 68 includes an upwardly extending cylinder 78 having a piston head 80 located therein for reciprocation and having a piston rod 82 secured to the head 80 and extending upwardly beyond the cylinder 78. The rod 82 has its upper end extending through the bore 42 and fixed therein by means of a nut and washer assembly 84 whereby the rod 82 and head 80 are fixed to the ribbed portion 40 of the support bracket 38. Appropriate seals, etc., are used to seal the cylinder 78 at opposite ends. The cylinder 78 extends through the bore 48 in the flat lower portion 46.

Thus the assembly 64 is interconnected to the spindle bracket assembly 36 for up-and-down relative movement by means of the pressure cylinder assembly 68. Normally the weight of the assembly 64 would bring it to its lowermost position at which position the piston head 80 would be located at its uppermost position in the cylinder 78. The latter positions can be selected by a vertical adjustment assembly 86. The latter assembly 86 includes a screw member 88 which extends upwardly through the lower portion 46 of the support bracket 38 parallelly to the support rods 56, 58 and at a side opposite from the pulley support bracket 50. The screw member 88 has an axially extending keyway 90 and is held from rotation by means including a key 92 which permits the screw member 88 to move in translation relative to the bracket 38. A first bevel gear 92 has a threaded central bore and is threaded upon the screw member 88. A second bevel gear 94 is engageable with the first gear 92 and is mounted to the lower portion 46 for rotation about an axis normal to that of the first gear 92 by means including a shaft 96 which is provided with a plurality of flats in order to facilitate gripping by a wrench. Thus by rotating the second gear 94 the first gear 92 is rotated moving the screw member 88 up or down. The screw member is threaded over substantially its entire length but terminates at its lower end in a smooth, unthreaded portion having an enlarged head 97. The shank of the screw member 88 extends in clearance relationship through a bore through the housing of the bearing assembly 66 with the head 97 engaging the housing for the bearing assembly 66 and thereby limiting the latter's downwardmost position. Thus by manipulation of the shaft 96 the lowermost position of the spindle, work pressure cylinder, etc., assembly 64 can be selected. Thus normally the latter assembly 64 will be in this lowermost position.

In operation the workpiece to be finished and the work wheel, such as wheel 28, are moved relatively into engagement. If the workpiece has an irregular contour it is important that the work wheel be able to follow it and engage the surface a selected uniform work pressure to finish the surface evenly. This is accomplished by means of the pressure assembly 68 in a manner to be presently described. A fluid passage defined by a connector 98 and a passageway 100 through the piston rod 82 is in communication with the rod end of the cylinder 78. By applying a selected fluid pressure to the rod end of cylinder 78 the weight of the spindle, work pressure cylinder, etc. assembly 64 can be counterbalanced. A fluid passage defined by a connector 102, a passageway 104 and a port 106 communicates with the head end of the cylinder 78. By applying a selected fluid pressure to the head end relative to the rod end the force applied to the workpiece by the work wheel 28 can be selected, independently of the weight of the assembly 64, to be of a desired magnitude for optimum results for that finishing operation. Note that the up-and-down movement of the assembly 64 is guided by the support rods 56, 58 in bushings 60, 62.

The work wheel 28 is driven by the motor 30 via a plurality of endless belts 108. Note, however, that during a finishing operation the spindle, work pressure cylinder, etc., assembly 64 will move up and down relative to the motor 30 as the contour of the surface being finished changes. Note also that the lowermost position of the assembly 64 can be set via the vertical adjustment assembly 86. With the apparatus of the work wheel mechanism 20 these up and down variations can be made without the necessity of altering the tension on the belts 108. This is accomplished by an arrangement of pulleys including the first pulley 54, the drive pulley 76 and an idler pulley 110. The pulleys 54 and 76 are mounted to be in fixed, immovable positions while the idler pulley 110 is provided to be selectively movable to permit general belt tightening when required and also to permit tensioning of the belts 108 as when different sized pulleys are used to effectuate changes in speed of the wheel 28.

The idler pulley 110 is mounted to one end of pulley arm 112 for rotation about an axis parallel to the axes of rotation of pulleys 54, 76 and located generally above and intermediate the latter axes. The pulley arm 112 is pivotally mounted to the upper end of an adjustment bracket 114 by means of a pivot shaft 116 which is fixed to the oppsite end of the pulley arm 112 by a set screw 118. The pivot shaft 116 is journaled at its rearward end in a bushing 121 supported on a bore in the upper end of the adjustment bracket 114 and at its forward end in a bushing 122 supported on an end plate 124 which is fixed to the upper end of the adjustment bracket 114 via a spacer and a pair of bolts 126. Thus the axis of the idler pulley 110 can be pivoted generally up and down by pivoting the pulley arm 112 at its pivot shaft 116. This pivoting is accomplished by means to be presently described. Below the bushing 121 in adjustment bracket 114, a pivot post 120 is axially secured via a lock ring 132 and is rotatable and has an enlarged portion 134 extending forwardly. A threaded adjustment stud 136 is threadably connected to the enlarged portion 134 and extends in a direction normal to the pivot axis of the pivot post 120 and has one end engageable in a pocket 138 in a downwardly, depending portion 140 of the pivot arm 112. Thus as the adjustment stud 136 is threaded in or out, the pivot arm 112 is pivoted about the axis of the pivot shaft 116 moving the axis of the idler pulley 110 generally up or down. The stud 136 can pivot via the pivot post 120 and hence can have its engaging end maintained within the pocket 138. The opposite end of the stud 136 is provided with an Allen type socket 142 in order to facilitate rotation by a wrench. A set screw 144 extends axially through the enlarged portion 38 of pivot post 120 and can be moved into engagement with the adjustment stud 136 to prevent it from rotating.

A support bracket 146 is fixed to the top of the housing of the bearing assembly 66 at its rearward end and opposite from the cylinder assembly 68. The adjustment bracket 114 is pivotally supported at its lower end to the support bracket 146 via a shaft 148 which is axially secured at its rearward end to the adjustment bracket 114 via a lock ring 150 and at its forward end to the support bracket 146 via a lock ring 152. Thus by rotation of the adjustment bracket 114 the axis of rotation of the idler pulley 110 can be moved generally horizontally. The position of the adjustment bracket 114 can be fixed by means of a bolt and washer assembly 154 in which the bolt extends through an arcuate slot 156 in the adjustment bracket 114 and is in threaded engagement with the support bracket 146.

The motor 30 has a pulley 158 at its rearward end in general vertical alignment with drive pulley 76 and all of the pulleys 54, 76, 110 and 158 are generally in a common vertical plane with the belts 108 being threaded from the top of motor pulley 158, downwardly and around the bottom of drive pulley 76, upwardly and around the top of idler pulley 110, downwardly and around the bottom of the pulley 54 and upwardly to return to the top of the motor pulley 158. Note that the direction of extension of that straight portion of the belts 108 between the drive pulley 76 and the motor pulley 158 is parallel to the direction of extension of that straight portion of the belts 108 between the pulley 54 and the idler pulley 110. With this parallel relationship, as the assembly 64 including drive pulley 76 and idler pulley 110 is moved up or down the tension on the belts 108 is maintained generally the same. With the compound adjustment permitted by both the pulley arm 112 and the adjustment bracket 114 this parallel relationship can be maintained even though the belts 108 be tightened by movement of idler pulley 110 or one or more of the various pulleys be changed in size.

The work wheel mechanism 20 includes a mounting structure, generally indicated by the numeral 160, by which the mechanism 20 can be mounted onto the support structure 22. The mounting structure 160 comprises a channel portion 162 and a tubular split housing portion 164 which has a through opening through which the support tube 34 extends. Spanner nuts 166, 168 are threadably mounted on the tube 34 at opposite ends of the housing portion 164. Thus by changing the positions of the spanner nuts 166, 168 along the tube 34 the up-and-down position of the wheel 28 can be selected. Thus the work wheel mechanism 20 has a coarse means for setting the vertical position of the work wheel 28 via the mounting structure 160 and a fine adjustment of this position via the vertical adjustment assembly 86, previously described.

The mounting structure 160 also has means for changing the position of the wheel 28 by rotation about the axis of the support tube 34. A worm gear 170 (FIGURES 11, 14) is axially secured for rotation within a recess 172 in the bottom of the housing portion 164 and is keyed to the support tube 34 via a key 173 which engages a vertically extending keyway 174 in the tube 34. A worm 176 is journaled within the lower section of the housing portion 164 in geared engagement with the worm gear 170. Thus rotation of the worm 176 causes rotation of the worm gear 170 and of the support tube 34 and hence of the work wheel 28. The end of the worm 176 is provided with flats to facilitate gripping by a wrench. The keyway 174 extends for substantially the length of the support tube 34 so as to permit engagement by the key 173 with the tube 34 in various vertical positions. The housing portion 164 is generally split and a bolt 178 interconnects the two sides such that on tightening of the bolt 178 the housing portion 164 clamps the support tube 34. The work wheel mechanism 20 can be mounted in various positions and, as will be seen, is not restricted to a vertical mounting. With the mechanism 20 mounted in positions at an angle to the vertical, the worm gear 170 and worm 176 prevent the work wheel 28 from rotating when the clamping bolt 178 is loosened.

The housing portion 164 is secured to the support portion 162 by means of a pair of parallelly extending, vertically spaced rods 180, 182 which extend in a direction generally normal to the axis of the support tube 34. An adjustment bolt 184 is located between the rods 180, 182 and is axially held to the support portion 162 and threadably engages the housing portion 164 whereby rotation of the bolt 184 moves the housing portion 164 along the rods 180, 182. The bolt 184 has flats provided on an accessible end to facilitate being gripped by a wrench.

Figure 12:
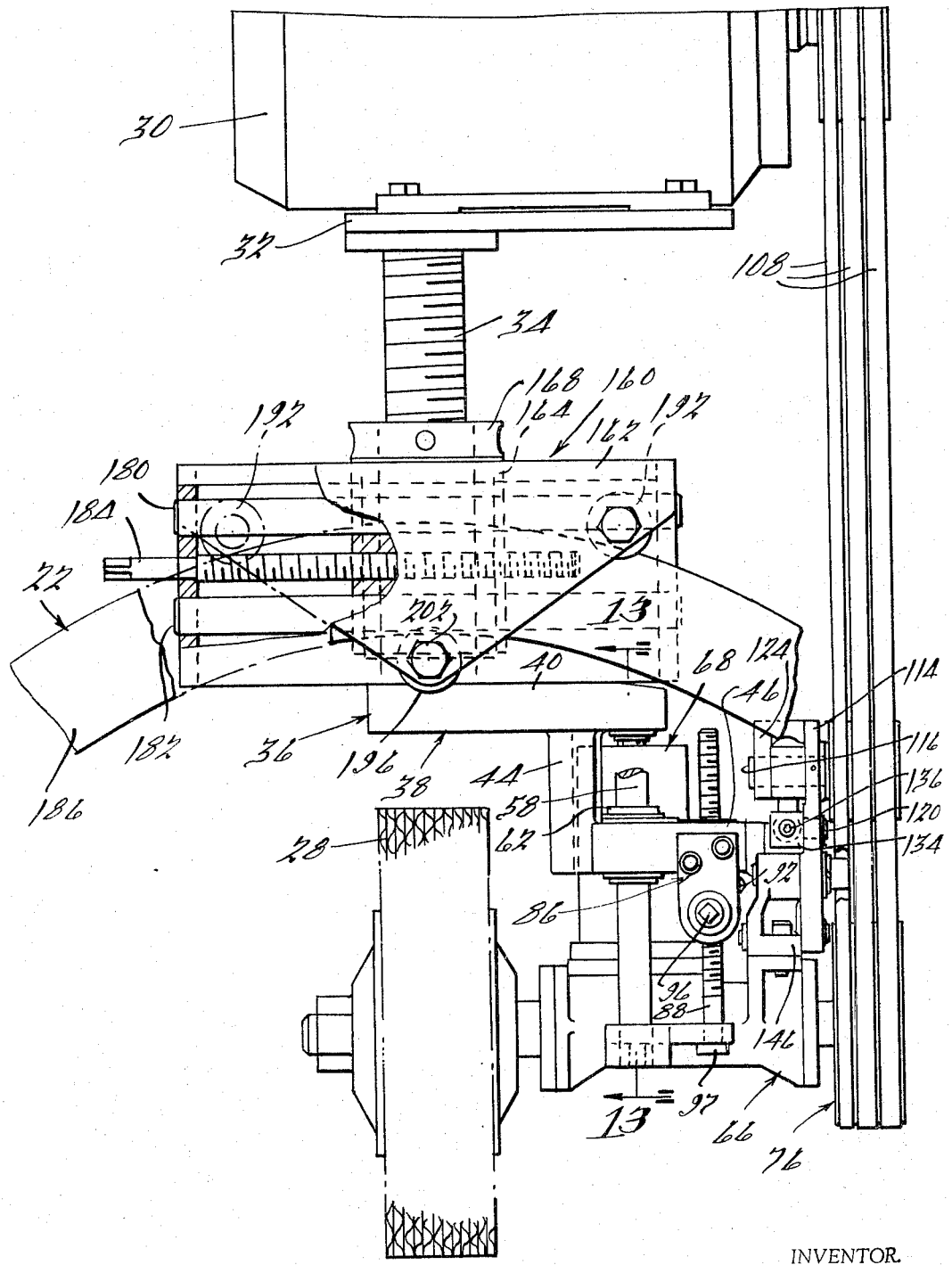
FIGURE 12 is a side elevational view of the work wheel mechanism of FIGURE 11 with some parts shown broken away and others shown in section and with the work wheel depicted in a raised position relative to the position shown in FIGURE 11.

The support portion 162 is adapted to be mounted to the support structure 22 which includes a pair of spaced support rails. In FIGURES 1, 11 and 12 a pair of generally arcuately extending support rails 186, 188 are shown to extend transversely over the work support table 26. The support rails 186, 188 extend generally semicircularly. The rails 186, 188 can be made of two pieces joined together in the center, as shown by the dotted area indicated by the numeral 5, to serve a purpose to be seen. The support portion 162 is generally U-shaped and has an outer leg 190 with two grooved rollers 192 in engagement with the radially outer edge of the rail 186 and one grooved roller 196 in engagement with the radially inner edge of rail 186. Similarly, an inner leg portion 198 has two outer rollers 194 and one inner roller 200 in engagement with the other rail 188. The roller 196 has a clamping bolt 202, whereby the sides of the groove of the roller 196 can be moved into frictional engagement with the rail 186 to hold the work wheel mechanism 20 in a selected position. Additional clamping bolts can be provided for the remaining rollers as required. As can be seen from FIGURE 1, a plurality of work wheel mechanisms 20 can be mounted on a single pair of support rails 186, 188 and oriented in various positions as required for that particular application. If necessary, additional support rails such as rails 186, 188 could be mounted longitudinally along the work support table 26.

The rails 186, 188 can be modified to suit various work requirements with some modifications being shown in FIGURES 5, 6, 7 and 9. In the modification of FIGURE 5 the rails 186, 188 have been moved transversely apart by means of a straight rail portion 204 secured at the centers of the two halves of the rails 186, 188 and hence the mechanisms 20 can be mounted either on the halves of the rails 186, 188 or on the straight portion 204. In FIGURES 6 and 8 the rails 186, 188 are selectively movable apart transversely to various positions by means of an adjustment screw 206 and a plurality of nuts 208. The transverse adjustment at the upper ends of the rails 186, 188 requires appropriate adjustment at the lower ends of the rails 186, 188 which can be obtained in a manner to be described. In FIGURE 9, the associated halves of the rails 186, 188 are offset longitudinally by means of a strap 210 and a separating post assembly 212. The associated halves of the rails 186, 188 may also be offset vertically as shown in FIGURE 7; of course, this requires appropriate adjustment at the lower ends of the rails 186, 188 which can be obtained in a manner to be described.

The support structure 22 is mounted upon the carrying structure 24 which includes a pair of support assemblies 214, 216. Since the support assemblies 214 and 216 are alike only the support assembly 214 will be described. The assembly 214 includes a pair of spaced, parallelly extending support rods 218, 220 (FIGURES 1, 10) and an adjustment stud 222 located therebetween. The associated lower end 224 of the support rails 186, 188 is secured to slide upon the rods 218, 220 and is threadably engaged with the stud 222 which is axially fixed whereby as it is rotated, the rails 186, 188 are moved transversely relative to the work support table 26. The stud 222 has its outer end provided with flats to facilitate gripping by an appropriate tool. Thus both halves of the rails 186, 188 can be moved transversely by the support assemblies 214, 216 in the same direction or in opposite directions to facilitate the modifications of FIGURES 5, 6 and 8.

The support rods 218, 220 are secured to a movable plate structure 226 which in turn is slidably secured to a roller assembly 228 (FIGURES 1, 4) for selective up and down movement by means to be described. The roller assembly 228 includes a plurality of grooved rollers 230 which are free to rotate and are supported upon a pair of vertically spaced, longitudinally extending rails 232 which are secured to the work support table 26. Thus the support structure 22 can be moved longitudinally along the work support table 26; to accomplish this movement, a piston actuated shot pin 264 is fixed to the inner end of the support assembly 214. A plurality of engagement brackets 260 are secured to a movable conveyor member 280 of the work support table 26. The conveyor member 280 is mounted upon a plurality of rollers 282 and can be moved longitudinally thereon by means of a chain structure 284 connected to the underside of the conveyor 280. As the conveyor brings a workpiece into a preselected position relative to the work wheel mechanisms 20 a trip mechanism (not shown) causes the shot pin 264 to move into a vertical slot in the brackets 260 whereby the support structure 22 is moved longitudinally and at the same time work wheels 28 are working on the workpiece. At a preselected position another trip mechanism (not shown) causes the shot pin 264 to be retracted and fluid actuated means (not shown) such as a piston or other suitable means is actuated to bring the support structure 22 back to its original position relative to the support table 26 and the sequence can then be repeated. The work wheel mechanisms 20 are arranged to perform the desired finishing operations on the workpieces.

The movable plate structure 226 has a pair of guide rods 286 which slidably extend through bushing portions 288 which are fixed to the roller assembly 228. A first bevel gear 234 is secured to the lower end of an adjustment stud 236 (FIGURES 1, 4). The stud 236 is axially fixed to the roller assembly 228 and is threadably engaged with a nut member 238 fixed to the movable plate structure 226. A second bevel gear 240 is in engagement with the first gear 234 and is rotatably supported on the roller assembly 228 for rotation about a transverse axis on a shaft 242. The outer end of the shaft 242 is provided with flats to facilitate gripping by a suitable wrench. As the second gear 240 is rotated on the shaft 242 the movable plate structure 226 can be moved vertically up or down on the guide rods 286. Hence, both ends of the support rails 186, 188 can be moved up or down either to similar positions or to vertically offset positions as shown in FIGURE 7. The brackets 260 are slotted to accommodate this vertical movement and hence to receive the shot pin 264 at various vertical positions.

Thus it can be seen that with the apparatus described thus far an extremely versatile structure has been shown which lends itself for use for a multitude of finishing operations and for performing a plurality of finishing operations substantially simultaneously.

A somewhat different structure is shown in FIGURES 2 and 3. The assembly of FIGURES 2 and 3, includes structure which is similar to that previously described and hence structure of FIGURES 2 and 3 similar to structure previously described have been given the same numeral designation with the addition of a letter subscript. For the assembly of FIGURES 2 and 3 a generally circular work table 250 is shown to have a plurality of workpieces W located thereon; the table 250 is being continuously rotated, by means not shown, so as to move the workpieces through a plurality of work stations indicated by 252, 254. At each of the work stations 252, 254 is a plurality of work wheel mechanisms 20a shown to be mounted upon a support structure 22a. Since the apparatus at both work stations 252, 254 is similar only work station 252 will be considered. The outer end 256 of the support structure 22a is connected to a carrying structure 24a which is similar to the structure 24 on one side of the work support table 26 of FIGURE 1. The inner end 258 is secured centrally of the table 250 for pivotal movement independently of the rotational movement of the table 250. The table 250 has a circumferentially extending index strip member 260a having a plurality of openings 262 with each located at a preselected position relative to one of the workpieces W. The carrying structure 24a differs from the structure 24 in that a roller assembly 228a has rollers 230a which are mounted to engage a pair of curved rails such as rail 232a. The roller assembly 228a further includes a piston actuated shot pin 264a which is located for engagement with one of the openings 262. In operation as the work table 250 moves a next one of the workpieces W into the work station 252 a trip mechanism (not shown) actuates the shot pin 264a moving it into engagement with the associated one of the openings 262 thus properly orienting the work wheel mechanism 20a for a finishing operation with its associated wheel 28a into engagement with the workpiece W. The workpieces W are also being continuously rotated about their individual axes. The work wheel mechanism 20a moves along the rails 232a with the work table 250 to a selected point at which another trip mechanism (not shown) is actuated whereby the shot pin 264a is retracted from that one of the openings 262 and at the same time a fluid actuated device (not shown) or other device well known in the art is actuated to retract the work wheel mechanism 20a back to its original position in the carrying structure 24a. The workpieces W of course can automatically be located upon and removed from the table 250 by means well known in the art.

Note that by use of a plurality of work wheel mechanisms a plurality of finishing operations can be performed upon a workpiece at one or more work stations. With this arrangement a compact structure can be provided with an ultimate reduction in necessary floor space realized in comparison to other finishing apparatus.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A portable work wheel mechanism comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for selectively adjusting the distance between said first and second axes, means securing said work wheel assembly to said mounting means for rotation of said work wheel assembly to selected positions about a third axis which extends generally, mutually perpendicularly relative to said first and second axes, said last named means including means for locating said work wheel assembly relatively to said mounting means at selected positions along said third axis said pulley means comprising a plurality of pulleys, an endless belt connecting said pulleys and transmitting the rotational energy from said motor means to said work wheel, and means supporting said pulleys for permitting changes in the distance between said first and second axes without appreciable change in the tension on said belt.

2. A portable work wheel mechanism comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, piston and cylinder means connected between said first and second means for selectively setting the engaging force between said work wheel and a workpiece to be finished, and third means connecting said first and second means for selectively adjusting the maximum distance between said first and second axes.

3. A portable work wheel mechanism comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, piston and cylinder means connected between said first and second means and permitting relative movement between said work wheel and said motor means and for selectively setting the engaging force between said work wheel and a workpiece to be finished, said piston and cylinder means comprising a piston connected to one of said first and second means, a cylinder connected to the other of said first and second means, and fluid passage means for communicating said cylinder at opposite ends, and third means connecting said first and second means for selectively adjusting the maximum distance between said first and second axes.

4. A portable work wheel mechanism comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, piston and cylinder means connected between said first and second means and permitting relative movement between said work wheel and said motor means and for selectively setting the engaging force between said work wheel and a workpiece to be finished, said piston and cylinder means comprising a piston connected to one of said first and second means, a cylinder connected to the other of said first and second means, and fluid passage means for communicating said cylinder at opposite ends, said pulley means comprising a plurality of pulleys, an endless belt interconnecting said pulleys, and means for maintaining the tension on said belt as said work wheel and said motor means move relatively to each other, and third means connecting said first and second means for selectively adjusting the maximum distance between said first and second axes.

5. A portable work wheel mechanism comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, piston and cylinder means connected between said first and second means and permitting relative movement between said work wheel and said motor means and for selectively setting the engaging force between said work wheel and a workpiece to be finished, said piston and cylinder means comprising a piston connected to one of said first and second means, a cylinder connected to the other of said first and second means, and fluid passage means for communicating said cylinder at opposite ends, said pulley means comprising a plurality of pulleys, an endless belt interconnecting said pulleys, and means selectively adjustable for setting the tension on said belt and operative for maintaining the tension on said belt as said work wheel and said motor means move relatively to each other and being further selectively adjustable to accommodate the use of different pulleys while still maintaining the tension on said belt as said work wheel and said motor means move relatively to each other, and third means connecting said first and second means for selectively adjusting the maximum distance between said first and second axes.

6. A portable work wheel mechanism comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for selectively adjusting the maximum distance between said first and second axis, means securing said work wheel assembly to said mounting means for rotation of said work wheel assembly to selected positions about a third axis which extends generally, perpendicularly relative to said first and second axes and generally parallel to a plane including said first and second axes, said last named means including means for locating said work wheel assembly relatively to said mounting means at selected positions along said third axis and means for locating said work wheel assembly at selected positions along a line perpendicular to said third axis.

7. A portable work wheel mechanism comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for selectively adjusting the maximum distance between said first and second axis, means securing said work wheel assembly to said mounting means for rotation of said work wheel assembly to selected positions about a third axis which extends generally perpendicularly relative to said first and second axes and generally parallel to a plane including said first and second axes, said last named means including a worm gear and a worm in engagement with said worm gear whereby rotation of said worm rotates said work wheel assembly by means of the rotation of said worm gear said pulley means comprising a plurality of pulleys, an endless belt connecting said pulleys and transmitting the rotational energy from said motor means to said work wheel, and means supporting said pulleys for permitting changes in the distance between said first and second axes without appreciable change in the tension on said belt.

8. A portable work wheel mechanism comprising: a work wheel assembly and mounting means for mounting said work wheel assembly, said work wheel assembly comprising a work wheel, a bearing assembly having a shaft supporting said work wheel for rotation about a first axis, a motor for providing rotational energy about a second axis, second means for supporting said motor with said second axis located in spaced parallelism with said first axis, said second means including an externally threaded support tube having one end fixed to the housing of said motor, pulley means connecting said motor and the opposite end of said shaft of said bearing assembly for transmitting the rotational energy from said motor to said work wheel, a cylinder, a piston reciprocably mounted in said cylinder, means connecting said cylinder to one of the opposite end of said support tube and said bearing assembly whereby the force applied to the other of the opposite end of said support tube and said bearing assembly whereby the force applied by said work wheel on a workpiece can be selectively adjusted by adjusting the pressure in said cylinder on opposite sides of said piston, means connecting said bearing assembly and said opposite end of said support tube for selectively adjusting the maximum distance between said first and second axes, means including a threaded nut member engageable with said support tube securing said work wheel assembly to said mounting means for locating said work wheel assembly relative to said mounting means at selected positions along the axis of said support tube.

9. A portable work wheel mechanism comprising: a work wheel assembly and mounting means for mounting said work wheel assembly, said work wheel assembly comprising a work wheel, a bearing assembly having a shaft supporting said work wheel for rotation about a first axis, a motor for providing rotational energy about a second axis, second means for supporting said motor with said second axis located in spaced parallelism with said first axis, said second means including an externally threaded support tube having one end fixed to the housing of said motor, pulley means connecting said motor and the opposite end of said shaft of said bearing assembly for transmitting the rotational energy from said motor to said work wheel, a cylinder, a piston reciprocably mounted in said cylinder, means connecting said cylinder to one of the opposite end of said support tube and said bearing assembly, means connecting said piston to the other of the opposite end of said support tube and said bearing assembly whereby the force applied by said work wheel on a workpiece can be selectively adjusted by adjusting the pressure in said cylinder on opposite sides of said piston, means connecting said bearing assembly and said opposite end of said support tube for selectively adjusting the maximum distance between said first and second axes, means including a threaded nut member engageable with said support tube securing said work wheel assembly to said mounting means for locating said work wheel assembly relative to said mounting means at selected positions along the axis of said support tube, a worm gear keyed to said support tube and axially retained to said mounting means, a worm rotatably supported on said mounting means in engagement with said worm gear whereby rotation of said worm causes rotation of said worm gear and hence of said support tube about its axis.

10. A portable work wheel mechanism comprising: a work wheel assembly and mounting means for mounting said work wheel assembly, said work wheel assembly comprising a work wheel, a bearing assembly having a shaft supporting said work wheel for rotation about a first axis, a motor for providing rotational energy about a second axis, second means for supporting said motor with said second axis located in spaced parallelism with said first axis, said second means including an externally threaded support tube having one end fixed to the housing of said motor, pulley means connecting said motor and the opposite end of said shaft of said bearing assembly for transmitting the rotational energy from said motor to said work wheel, a cylinder, a piston reciprocably mounted in said cylinder, means connecting said cylinder to one of the opposite end of said support tube and said bearing assembly, means connecting said piston to the other of the opposite end of said support tube and said bearing assembly whereby the force applied by said work wheel on a workpiece can be selectively adjusted by adjusting the pressure in said cylinder on opposite sides of said piston, means connecting said bearing assembly and said opposite end of said support tube for selectively adjusting the maximum distance between said first and second axes, means including a threaded nut member engageable with said support tube securing said work wheel assembly to said mounting means for locating said work wheel assembly relative to said mounting means at selected positions along the axis of said support tube, a worm gear keyed to said support tube and axially retained to said mounting means, a worm rotatably supported on said mounting means in engagement with said worm gear whereby rotation of said worm causes rotation of said worm gear and hence of said support tube about its axis, and means for locating said work wheel assembly at selected positions along a line perpendicular to the axis of said support tube.

11. A portable work wheel mechanism comprising: a work wheel assembly and mounting means for mounting said work wheel assembly, said work wheel assembly comprising a work wheel, a bearing assembly having a shaft supporting said work wheel for rotation about a first axis, a motor for providing rotational energy about a second axis, second means for supporting said motor with said second axis located in spaced parallelism with said first axis, said second means including an externally threaded support tube having one end fixed to the housing of said motor, pulley means connecting said motor and the opposite end of said shaft of said bearing assembly for transmitting the rotational energy from said motor to said work wheel, a cylinder, a piston reciprocably mounted in said cylinder, means connecting said cylinder to one of the opposite end of said support tube and said bearing assembly, means connecting said piston to the other of the opposite end of said support tube and said bearing assembly whereby the force applied by said work wheel on a workpiece can be selectively adjusted by adjusting the pressure in said cylinder on opposite sides of said piston, said pulley means comprising a plurality of pulleys, an endless belt interconnecting said pulleys, and means selectively adjustable for setting the tension on said belt and operative for maintaining the tension on said belt as said work wheel and said motor move relatively to each other and being further selectively adjustable to accommodate the use of different pulleys while still maintaining the tension on said belt as said work wheel and said motor move relatively to each other, means connecting said bearing assembly and said opposite end of said support tube for selectively adjusting the maximum distance between said first and second axes, means including a threaded nut member engageable with said support tube securing said work wheel assembly to said mounting means for locating said work wheel assembly relative to said mounting means at selected positions along the axis of said support tube, a worm gear keyed to said support tube and axially retained to said mounting means, a worm rotatably supported on said mounting means in engagement with said worm gear whereby rotation of said worm causes rotation of said worm gear and hence of said support tube about its axis, and means for locating said work wheel assembly at selected positions along a line perpendicular to the axis of said support tube.

12. A portable work wheel mechanism comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, piston and cylinder means connected between said first and second means and permitting selective movement between said work wheel and said motor means and for selectively setting the engaging force between said work wheel and a workpiece to be finished, said pulley means comprising a plurality of pulleys including a motor pulley fixed to said motor means, a drive pulley connected to said work wheel, an idler pulley, and a different pulley, an endless belt interconnecting said pulleys, means connecting said different pulley to said second means, and adjustment means connecting said idler pulley to said first means and permitting selective movement of said idler pulley to positions at which the tension is maintained on said belt as said work wheel and said motor means move relatively to each other.

13. A portable work wheel mechanism comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, piston and cylinder means connected between said first and second means and permitting selective movement between said work wheel and said motor means and for selectively setting the engaging force between said work wheel and a workpiece to be finished, said pulley means comprising a plurality of pulleys including a motor pulley fixed to said motor means, a drive pulley connected to said work wheel, an idler pulley, and a different pulley, means connecting said different pulley to said second means at a point intermediate and to one side of the axes of said motor and drive pulleys, adjustment means connecting said idler pulley to said first means at a point intermediate the axes said different and motor pulleys and intermediate the axes of said different and drive pulleys, an endless belt extending from the outer edge of said motor pulley, to the outer edge of said drive pulley, to the inner edge of said idle pulley, to the outer edge of said different pulley and back to the outer edge of said motor pulley, said adjustment means including means selectively adjustable for positioning said idler pulley with the portion of said belt from said different pulley to said idler pulley maintained parallel to the portion of said belt from said drive pulley to said motor pulley whereby the tension is maintained on said belt as said work wheel and said motor means move relatively to each other.

14. A portable work wheel mechanism comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, piston and cylinder means connected between said first and second means and permitting selective movement between said work wheel and said motor means and for selectively setting the engaging force between said work wheel and a workpiece to be finished, said pulley means comprising a plurality of pulleys including a motor pulley fixed to said motor means, a drive pulley connected to said work wheel, an idler pulley, and a different pulley, means connecting said different pulley to said second means at a point intermediate and to one side of the axes of said motor and drive pulleys, adjustment means connecting said idler pulley to said first means at a point intermediate the axes said different and motor pulleys and intermediate the axes of said different and drive pulleys, an endless belt extending from the outer edge of said motor pulley, to the outer edge of said drive pulley, to the inner edge of said idler pulley, to the outer edge of said different pulley and back to the outer edge of said motor pulley, said adjustment means including means selectively adjustable for positioning said idler pulley with the portion of said belt from said different pulley to said idler pulley maintained parallel to the portion of said belt from said drive pulley to said motor pulley whereby the tension is maintained on said belt as said work wheel and said motor means move relatively to each other, said adjustment means including an adjustment bracket mounted to said first means for pivotal movement in a direction generally normal to a line between the axes of said motor and drive pulleys, and a pivot arm mounted to said adjustment bracket for pivotal movement in a direction generally parallel to a line between the axes of said motor and drive pulleys, said idler pulley being mounted on said pivot arm.

15. Apparatus for finishing workpieces on a longitudinally extending work table comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for selectively adjusting the distance between said first and second axes, means securing said work wheel assembly to said mounting means for rotation of said work wheel assembly to selected positions about a third axis which extends generally, mutually perpendicularly relative to said first and second axes, said last named means including means for locating said work wheel assembly relatively to said mounting means at selected positions along said third axis, said pulley means comprising a plurality of pulleys, an endless belt connecting said pulleys and transmitting the rotational energy from said motor means to said work wheel, and means supporting said pulleys for permitting changes in the distance between said first and second axes without appreciable change in the tension on said belt support means extending transversely over the work table and comprising a pair of spaced rails, said mounting means including means for gripping said rails at selected positions.

16. The apparatus of claim 15 with at least a portion of said rail extending arcuately over the work table to define a portion of a circle.

17. Apparatus for finishing workpieces on a longitudinally extending work table comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for selectively adjusting the distance between said first and second axes, means securing said work wheel assembly to said mounting means for rotation of said work wheel assembly to selected positions about a third axis which extends generally, mutually perpendicularly relative to said first and second axes, said last named means including means for locating said work wheel assembly relatively to said mounting means at selected positions along said third axis, support means extending transversely over the work table and comprising a pair of spaced rails, said mounting means including means for gripping said rails at selected positions, carrying means for supporting said support means on opposite ends of the work table and including means for moving said support means transversely of the work table and in a direction up and down relative to the work table.

18. Apparatus for finishing workpieces on a longitudinally extending work table comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for selectively adjusting the distance between said first and second axes, means securing said work wheel assembly to said mounting means for rotation of said work wheel assembly to selected positions about a third axis which extends generally, mutually perpendicularly relative to said first and second axes, said last named means including means for locating said work wheel assembly relatively to said mounting means at selected positions along said third axis, support means extending transversely over the work table and comprising a pair of spaced rails, said mounting means including means for gripping said rails at selected positions, carrying means for supporting said support means on opposite ends of the work table and including means for moving said support means transversely of the work table and in a direction up and down relative to the work table, said carrying means including means for moving said support means longitudinally relative to the work table.

19. Apparatus for finishing workpieces on a longitudinally extending work table comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for selectively adjusting the distance between said first and second axes, means securing said work wheel assembly to said mounting means for rotation of said work wheel assembly to selected positions about a third axis which extends generally, mutually perpendicularly relative to said first and second axes, said last named means including means for locating said work wheel assembly relatively to said mounting means at selected positions along said third axis, support means extending transversely over the work table and comprising a pair of spaced rails, said mounting means including means for gripping said rails at selected positions, carrying means for supporting said support means on opposite ends of the work table and including means for independently moving the opposite ends of said support means transversely of the work table and independently moving said opposite ends up and down relative to the work table.

20. The apparatus of claim 19 with said spaced rails being transversely split and means for selectively connecting the split halves of said rails with said split halves oppositely separated from each other.

21. The apparatus of claim 19 with said spaced rails being transversely split and means for selectively connecting the split halves of said rails with said split halves longitudinally offset from each other.

22. The apparatus of claim 19 with said spaced rails being transversely split and means for selectively connecting the split halves of said rails with said split halves vertically offset from each other.

23. Apparatus for finishing workpieces comprising: a table for carrying workpieces and for continuously rotating the workpieces through at least one work station, said work station comprising: a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for selectively adjusting the distance between said first and second axes, means securing said work wheel assembly to said mounting means for rotation of said work wheel assembly to selected positions about a third axis which extends generally, mutually perpendicularly relative to said first and second axes, said last named means including means for locating said work wheel assembly relatively to said mounting means at selected positions along said third axis, means for successively connecting said mounting means to said table for rotation therewith in response to one workpiece in said work station and for disconnecting said mounting means from said table after movement of a selected distance and for returning said mounting means to its original position.

24. Apparatus for finishing workpieces comprising: a table for carrying workpieces and for continuously rotating the workpieces through at least one work station, said work station comprising a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for selectively adjusting the distance between said first and second axes, means securing said work wheel assembly to said mounting means for rotation of said work wheel assembly to selected positions about a third axis which extends generally, mutually prependicularly relative to said first and second axes, said last named means including means for locating said work wheel assembly relatively to said mounting means at selected positions along said third axis, support means extending radially inwardly over at least a portion of said table and having its radially inner end pivotally supported independently of said table and including a pair of spaced rails, said mounting means including means for gripping said rails at selected positions, carrying means for supporting the radially outer end of said support means for rotation about the axis of rotation of said table, means for successively connecting said carrying means to said table for rotation therewith in response to one workpiece in said work station and for disconnecting said mounting means from said table after movement of selected distance and for returning said carrying means back to its original position.

25. The apparatus of claim 24 with at least a portion of said rails extending arcuately to define a portion of a circle.

26. Apparatus for finishing workpieces comprising: a longitudinally extending work table, conveyor means on said work table for supporting the workpieces and moving the workpieces longitudinally, a work wheel assembly and mounting means for mounting said work wheel assembly, said work wheel assembly comprising a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for selectively adjusting the distance between said first and second axes, means securing said work wheel assembly to said mounting means for rotation of said work wheel assembly to selected positions about a third axis which extends generally, mutually perpendicularly relative to said first and second axes, said last named means including means for locating said work wheel assembly relatively to said mounting means at selected positions along said third axis, support means extending transversely over said said work table and comprising a pair of spaced rails, said mounting means including means for gripping said rails at selected positions, conveying means connected to said support means at opposite sides of said work table and comprising engaging means selectively engageable with said conveyor means for moving said support means longitudinally for a selected distance and disengageable from said conveyor means after movement of said support means said selected distance and means for returning said support means to its original position upon disenagement of said engaging means from said conveyor means.

27. Apparatus for finishing workpieces comprising: a table for continuously conveying the workpieces through at least one work station, said work station including at least one portable work wheel mechanism, said work wheel mechanism comprising a work wheel assembly and mounting means for mounting said work wheel assembly, said work wheel assembly including a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for movement of said axes towards and away from each other, support means extending over said table for supporting a plurality of work wheel mechanisms, said mounting means selectively engageable with said support means at different positions relative to said table, carrying means for supporting said support means for movement relative to said table, means for successively connecting said carrying means to said table for movement therewith in response to one workpiece moving to said work station and for disconnecting said mounting means from said table after movement of said carrying means a selected distance and for returning said carrying means back to its original position.

28. The apparatus of claim 27 with said support means comprising a pair of parallelly extending, spaced rails extending arcuately to define a portion of a circle.

29. The apparatus of claim 28 with said spaced rails being transversely split and means for selectively connecting the split halves of said rails with said split halves oppositely separated from each other.

30. The apparatus of claim 28 with said spaced rails being transversely split and means for selectively connecting the split halves of said rails with said split halves longitudinally offset from each other.

31. The apparatus of claim 28 with said spaced rails being transversely split and means for selectively connecting the split halves of said rails with said split halves vertically offset from each other.

32. A portable work wheel mechanism comprising: a work wheel assembly and mounting means for mounting said work wheel assembly, said work wheel assembly comprising: a work wheel, first means for supporting said work wheel for rotation about a first axis, motor means for providing rotational energy about a second axis, second means for supporting said motor means with said second axis located in spaced parallelism with said first axis, pulley means connecting said motor means and said first means for transmitting the rotational energy from said motor means to said work wheel, third means connecting said first and second means for selectively adjusting the distance between said first and second axes along a third axis which extends generally, mutually perpendicularly relative to said first and second axes, said pulley means comprising a plurality of pulleys with one of said pulleys being connected with said motor means and another of said pulleys being connected with said work wheel, said pulley means further comprising an endless belt connecting said pulleys including said first and second pulleys and means supporting said pulleys for permitting changes in said distance between said first and second axes without appreciable change in the tension on said belt.

References Cited by the Examiner
UNITED STATES PATENTS

| | | | |
|---|---|---|---|
| 756,302 | 4/1904 | Walker | 51—166 |
| 2,106,082 | 1/1938 | Carlson | 51—166 |
| 2,194,780 | 3/1940 | Anderson | 51—105 |
| 2,239,639 | 4/1941 | Amidon | 51—95 |
| 2,324,416 | 7/1943 | Murray | 51—166 |
| 2,325,622 | 8/1943 | Murray | 51—76 |
| 2,386,649 | 10/1945 | Belcourt | 51—108 |
| 2,748,546 | 6/1956 | Lane | 51—166 |
| 2,758,428 | 8/1956 | Kohring | 51—166 |

LESTER M. SWINGLE, *Primary Examiner.*